United States Patent
Navarro et al.

(10) Patent No.: US 6,319,875 B1
(45) Date of Patent: Nov. 20, 2001

(54) INITIATION SYSTEM COMPRISING A SILYLATED INITIATOR FOR ANIONIC (CO) POLYMERIZATION OF (METH)ACRYLIC MONOMER(S) AND PROCESS USING SAME

(75) Inventors: Christophe Navarro, Bidache (FR); Axel H. E. Müller, Wiesbaden; Andreas R. Maurer, Weilrod, both of (DE); Robert Jerome, Sart-Jalhay (BE); Thomas Zundel, Durmenach (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/058,481

(22) Filed: Apr. 10, 1998

(30) Foreign Application Priority Data

Apr. 10, 1997 (FR) .................................. 97 04468

(51) Int. Cl.$^7$ .................................. B01J 31/12
(52) U.S. Cl. .................. 502/157; 502/152; 502/158; 502/171
(58) Field of Search .................. 502/152, 157, 502/158, 171

(56) References Cited

U.S. PATENT DOCUMENTS

| | | | |
|---|---|---|---|
| 5,079,206 | * 1/1992 | Ballard et al. | 502/152 |
| 5,362,699 | * 11/1994 | Shepherd et al. | 502/158 |
| 5,416,168 | * 5/1995 | Willis et al. | 525/338 |
| 5,563,275 | 10/1996 | Gentry, Jr. et al. . | |
| 5,605,991 | 2/1997 | Chamberlain et al. . | |

FOREIGN PATENT DOCUMENTS

| | | |
|---|---|---|
| 462 588 A | 12/1991 | (EP) . |
| 524 054 A | 1/1993 | (EP) . |
| 749 987 A | 12/1996 | (EP) . |
| 524 054 B | 3/1997 | (EP) . |
| 2241239 | * 8/1991 | (GB) . |

OTHER PUBLICATIONS

T. Zundel et al., "Trimethylsilylmethyllithium: a novel intiator for the anionic polymerization of cyclosiloxanes and vinyl monomers", Macromol. Symp. 88, pp. 177–189 (1994).

* cited by examiner

Primary Examiner—Elizabeth D. Wood
(74) Attorney, Agent, or Firm—Pennie & Edmonds LLP

(57) ABSTRACT

The initiation system comprises (1) at least one silylated initiator and (2) at least one alkaline metal alcoholate as ligand. The silylated initiator may be monofunctional and selected in particular from among the compounds of Formula (I) or difunctional and selected in particular from among the compounds of Formula (II):

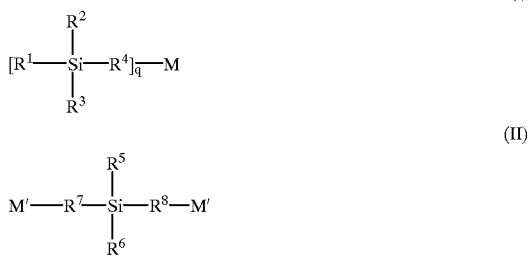

wherein $R^1$, $R^2$, $R^3$ each independently represent a $C_1$–$C_8$ alkyl radical, linear or branched; $R^4$ is a linear or branched $C_1$–$C_8$ alkylene radical; M is an alkaline metal or alkaline earth metal (valence q of 1 or 2); $R^5$ and $R^6$ each independently represent an alkyl radical, linear or branched, at $C_1$–$C_8$; $R^7$, $R^8$ each independently represent a $C_1$–$C_8$ alkylene radical, linear or branched; M' is an alkaline metal. Application is to the preparation of (meth)acrylic (co)polymers.

10 Claims, 1 Drawing Sheet

INITIATION SYSTEM COMPRISING A SILYLATED INITIATOR FOR ANIONIC (CO) POLYMERIZATION OF (METH)ACRYLIC MONOMER(S) AND PROCESS USING SAME

TABLE OF CONTENTS

|   | PAGE |
|---|---|
| 1. Background Of The Invention | 2 |
|    1.1. Technical Field | 2 |
|    1.2. Description Of Related Art | 3 |
| 2. Summary Of The Invention | 4 |
| 3. Description Of The Preferred Embodiments | 5 |
|    3.1. Example 1 | 11 |
|    3.2. Example 2 (comparative) | 16 |
|    3.3. Example 3 | 18 |
|    3.4. Example 4 (comparative) | 18 |
|    3.5. Example 5 | 21 |
|    3.6. Example 6 (comparative) | 21 |
|    3.7. Examples 7 and 8 | 22 |
|    3.8. Examples 9 and 10 | 22 |
|    3.9. Example 11 | 22 |
|    3.10. Example 12 | 23 |
|    3.11. Example 13 | 23 |
| 4. Claims | 25 |
| 5. Abstract Of The Disclosure | 30 |
| 6. Drawing(s) | |

1. BACKGROUND OF THE PRESENT INVENTION

1.1. Technical Field

The present invention relates to an initiation system for the anionic polymerization of (meth)acrylic monomers, this system being particularly useful for initiation of anionic polymerization of methyl methacrylate in order to get syndiotactic poly(methyl methacrylate) (PMMA), for initiation of anionic polymerization of monomer acrylates where the carbon in α of the oxygen of the ester is tertiary, secondary or particularly primary (hereafter we will use the designation of tertiary, secondary or primary acrylate), for initiation of random or block copolymerization of (meth)acrylic monomers, as well as for the formation of star copolymers comprising arms formed of (meth)acrylic blocks linked to the core or node formed from a multifunctional compound (for example a deactivating agent or a monomer leading to a polymer, whether or not crosslinked).

1.2. Description of Related Art

In European Patent Application EP-A-0524054, the anionic polymerization of alkyl (meth)acrylates using an initiation system comprising a monofunctional or difunctional initiator and a ligand formed by an alkoxy alcoholate of an alkaline metal is described.

With this process, polymerization is well controlled, especially at low temperatures.

The anionic synthesis of syndiotactic PMMA or polyacrylates with controlled mass and polymolecularity required the use of sterically "encumbered" initiators to avoid secondary reactions during initiation. Since the use of pure butyllithium (n-, sec.-, tert.-) as initiator does not permit an initiation efficiency of more than 20% to be achieved, the system proposed to date generally included (1) the initiator 1,1-diphenylhexyllithium - reaction product of n-butyllithium with 1,1-diphenylethylene - and (2) an alkoxy alcoholate ligand as described in EP-A-0524054. The use of 1,1-diphenylethylene makes this process more expensive.

PMMA intrinsically, that is, when it contains nothing other than repetitive units, has a remarkable resistance to aging. Conventional initiation with 1,1-diphenylhexyllithium—the bearer of two aromatic rings—entails the presence of aromatic groups fixed at the beginning of the polymer chain. It is well known that the presence of aromatic groups diminishes the resistance to aging of polymers that contain them, which thus entails a disadvantage for the PMMA.

Th. Zundel, J. Ming Yu, L. Lestel, D. Teyssié and S. Boileau, Macromol. Symp. 88, 177–189 (1994) described trimethylsilylmethyllithium as an initiator for anionic polymerization for cyclosiloxanes and vinyl monomers. Although this article indicates that this organolithiated compound also initiates anionic polymerization of methyl methacrylate, only a few preliminary results were reported. With methyl methacrylate, there are extensive secondary reactions when the polymerization takes place at 0° C. according to the process described, which entails a broad distribution of molecular weights, regardless of the solvent used. In all cases, the number average molecular weights (Wn) measured are significantly higher than the theoretical values. This probably is due to the fact that the initiation rate is low compared to the propagation rate. A substantial fraction of the initiator remains unused upon completion of polymerization. The microstructures of samples of PMMA obtained by this process were analyzed by NMR$^1$H. They are similar to those observed traditionally for PMMAs prepared with initiators of the organolithium type. A high level of isotactic triads is observed in toluene with lithium counter-ions. In contrast to this, the syndiotactic triads predominate when the polymerization takes place in THF at −78° C. or when AlEt$_3$ is added to the organolithium initiator in toluene. Now, PMMA with a high level of syndiotactic triads is interesting, because the polymer then has a higher glass transition temperature and thus greater heat resistance. In the prior process, PMMA could not be prepared except with maximum contents of syndiotactic triads of 67%, by working in the presence of an additive such as AlEt3 over a very long period (16 hours), in a polar medium at very low temperatures. This process is thus far from being usable in industry.

2. SUMMARY OF THE INVENTION

The initiation system comprises (1) at least one silylated initiator and (2) at least one alkaline metal alcoholate as ligand. The silylated initiator may be monofunctional and selected in particular from among the compounds of Formula (I) or difunctional and selected in particular from among the compounds of Formula (II):

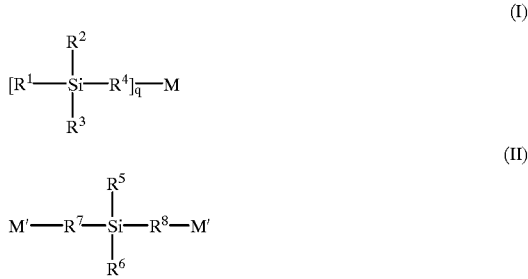

wherein $R^1$, $R^2$, $R^3$ each independently represent a $C_1$–$C_8$ alkyl radical, linear or branched; $R^4$ is a linear or branched $C_1$–$C_8$ alkylene radical; M is an alkaline metal or alkaline earth metal (valence q of 1 or 2); $R^5$ and $R^6$ each independently represent an alkyl radical, linear or branched, at $C_1-C_8$; $R^7$, $R^8$ each independently represent a $C_1-C_8$ alkylene radical, linear or branched; M' is an alkaline metal. Application is to the preparation of (meth)acrylic (co) polymers.

3. DESCRIPTION OF THE PREFERRED EMBODIMENTS

The filing Company discovered that, by combining a silylated initiator, particularly trimethylsilylmethyllithium, a "poor initiator", with a ligand consisting of an alkaline metal alcoholate, particularly of the type described in EP-A-0524054 above, an initiation system for the anionic (co) polymerization of (meth)acrylic monomers is obtained, which presents numerous advantages and permits resolution of the problems posed in the prior state of the art.

The first objective of this invention therefore is an initiation system for anionic (co)polymerization of (meth)acrylic monomers comprising:

(1) at least one silylated initiator; and (2) at least one alkaline metal alcoholate as ligand.

The silylated initiator may be monofunctional; it is then chosen, in particular, from among the compounds of Formula (I):

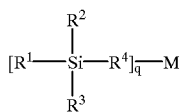

(I)

$R^1$, $R^2$, $R^3$ each independently represent an alkyl radical, linear or branched, containing 1 to 8 carbon atoms;

$R^4$ represents an alkylene radical, linear or branched, containing 1 to 8 carbon atoms;

M designates an alkaline metal or alkaline earth metal (valence q is 1 or 2).

The silylated initiator is also difunctional, and is then chosen, in particular, from among the compounds of Formula (II):

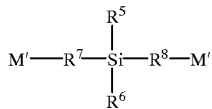

(II)

wherein:

$R^5$ and $R^6$ each independently represent a linear or branched alkyl radical containing 1 to 8 carbon atoms;

$R^7$ and $R^8$ each independently represent a linear or branched alkylene radical containing 1 to 8 carbon atoms; and M' designates an alkaline metal.

In Formula (I) or (II) above, $R^1$, $R^2$, $R^3$, $R^5$ and $R^6$ each preferably represent an alkyl radical with, preferably, 1 to 4 carbon atoms and very particularly, a methyl radical; $R^4$, $R^7$ and $R^8$ each preferably represent an alkylene radical with 1 or 2 carbon atoms and particularly the methylene radical, and M and M' each preferably represent lithium. A particularly appropriate initiator is trimethylsilylmethyllithium.

As for alkaline metal alcoholates (2), they may be chosen from among those of Formula (III):

 ROM" (III)

wherein:

M" represents an alkaline metal; and

R represents a radical of Formula (IV):

$$R^9(OR^{10})_p \qquad (IV)$$

wherein:

$R^9$ represents an alkyl radical, linear or branched, with 1 to 8 carbon atoms, an aryl radical, an arylalkyl radical, or alkylaryl, wherein the alkyl radical has 1 to 8 carbon atoms;

$R^{10}$ represents an alkylene radical, linear or branched, with 1 to 4 carbon atoms;

p is a whole number, 0, 1, 2 or 3; and when p is equal to 2 or 3, the $R^{10}$s are identical or different.

In Formula (III), M" represents lithium, in particular.

In Formula (IV), $R^9$ represents, for example, methyl, ethyl, propyl, butyl, pentyl, hexyl, heptyl, octyl, phenyl or benzyl radical, and particularly methyl; $R^{10}$ represents, for example, a methylene, ethylene, propylene, butylene or isobutylene radical, particularly ethylene.

The inventive initiation system permits synthesis of a PMMA with a high content of syndiotactic triads (-70%), in an apolar medium or mostly apolar medium, at reasonable temperatures and synthesis times.

It permits the synthesis of poly(meth)acrylates, particularly primary polyacrylates, of controlled molecular weight and polymolecularity.

Due to the very structure of the silylated initiators, the polymers obtained have improved aging resistance, contrary to the polymers obtained in the presence of 1,1-diphenylhexyllithium, as indicated above.

Under the same polymerization conditions, the above-cited combination of silylated initiator+lithiated ligand is more efficient than the above-cited combination of the conventional initiator, 1,1 -diphenylhexyllithium+lithiated ligand. It is then possible to have an efficiency comparable to the old system, with the new initiator in the presence of less lithiated ligand. Aside from a major impact on the cost of initiation, this implies a sharp decrease in the lithiated species present in the polymer.

The alcoholate (2)/initiator (1) molar ratio in the inventive initiation system varies within very broad limits. The quantity of alcoholate (2) must be sufficient to permit formation of a complex with the active polymerization core and thus allow the latter to be stabilized. The quantity of alcoholate (2) depends on the initiator (1) selected and on the monomer (s) to polymerize. The inventive alcoholate (2)/initiator (1) molar ratio is generally between 1 and 20; to obtain better results, this ratio preferably falls between 2 and 10.

This invention also concerns a process for anionic polymerization of (meth)acrylic monomers characterized in that the (co)polymerization is conducted in the presence of an initiation system as defined above.

The polymerization temperature may vary between –100° C. and +100° C., and preferably is lower at about –20° C. for the acrylates and at +30° C. for the methacrylates.

Polymerization, conducted in the presence of the inventive initiation system, preferably takes place in the absence of moisture and oxygen, and in the presence of at least one aprotic solvent, preferably selected from among benzene, toluene, ethylbenzene, tetrahydrofuran, diglyme, tetraglyme, orthoterphenyl, biphenyl, decaline, tetraline or mixtures thereof; toluene or ethylbenzene or a mixture of toluene-tetrahydrofuran or ethylbenzene-tetrahydrofuran may be used advantageously. The mixture may contain up to 10% by volume of tetrahydrofuran.

The inventive initiation system permits complete conversion of the monomers within a period of less than, and generally much less than, 30 minutes; the time depends on the temperature. In the case of polymerization of acrylates, this time may be much less than one second.

Inventive polymerization is possible in batch-type or tube reactors, but is not limited to them. It may be isothermal or adiabatic.

It may be conducted continuously, as described in Patent Application EP-A-0749987 and, in this case, the monomer (s) to be polymerized and the initiation system are first mixed in a micro-mixer (for instance, a micro-mixer of the cyclone or tangential jet type, or the impact-jet type), and the mixture is then injected into the (co)polymerization reactor. The residence time of the monomer(s) and the initiation system in the micro-mixer is less than the (co) polymerization time.

Using the inventive process, homopolymers, random copolymers or block copolymers or star polymers comprising arms formed from block or random (co)polymers are produced.

The monomers that is (co)polymerized by the inventive process are selected from among the (meth)acrylic monomers.

The term "(meth)acrylic monomer", as used here, means a monomer selected from among (meth)acrylates of the following respective formulae:

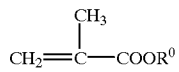

wherein $R^0$ is selected from among $C_1$–$C_{18}$ alkyl radicals, linear or branched, primary, secondary or tertiary, $C_5$–$C_{18}$ cycloalkyl, alkoxyalkyl and alkylthioalkyl radicals, wherein the alkyl radicals, linear or branched, have 1 to 18 carbon atoms, aryl and arylalkyl radicals, these radicals possibly being substituted by at least one atom of fluorine and/or at least one hydroxyl group after protection of this hydroxyl group; the (meth)acrylates of glycidyl, norbornyl, isobornyl, mono- and di-($C_1$–$C_{18}$) alkyl-(meth)acrylamides.

As examples of usable methacrylates, we cite the methacrylates of methyl, ethyl, 2,2,2-trifluoroethyl, n-propyl, isopropyl, n-butyl, sec.-butyl, tert.-butyl, n-amyl, i-amyl, n-hexyl, 2-ethylhexyl, cyclohexyl, octyl, i-octyl, nonyl, decyl, lauryl, stearyl, phenyl, benzyl, 1-hydroxy-ethyl, isobornyl, hydroxypropyl and hydroxybutyl. The preferred methacrylic monomer is methyl methacrylate.

As examples of acrylates of the above formula, we cite the acrylates of methyl, ethyl, n-propyl, isopropyl, n-butyl, sec.-butyl, tert.-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl.

In particular, the inventive initiation system permits preparation of methyl methacrylate polymers (PMMA) with a number average molecular weight ($\overline{Mn}$) of between 200 and $10^6$ g/mole, inclusive, and a polymolecularity index Ip ($\overline{Mw}/\overline{Mn}$) between 1.05 and 2.6. The PMMAs may have percentages in syndiotactic triads equal to or greater than 70% even in an apolar or mostly apolar solvent, which gives them a glass transition temperature of about 130° C. and thus a higher heat resistance than PMMAs prepared by free radical polymerization.

It is also possible to obtain, in high yields, alkyl acrylate polymers with number average molecular weight (Mn) of between 500 and 500,000 g/mole, inclusive, and an Ip (Vw/-L) between 1.05 and 2.6, inclusive. These homopolymers are reactive, which allows block copolymers to be prepared.

The following examples illustrate this invention, without, however, limiting the scope thereof. In the examples, the following abbreviations were used:

nBuA and PnBuA=n-butyl acrylate and poly(n-butyl acrylate)

MMA and PMMA=methyl methacrylate and poly(methyl methacrylate)

TMSM-Li=trimethylsilylmethyllithium;

DPE=1,1-diphenylethylene;

BuLi=n-butyllithium;

DPH-Li=1,1-diphenylhexyllithium;

THF=tetrahydrofuran;

$[A]_0$=initial concentration of the initiator;

$[L]$=concentration of ligand;

$[M]_0$=initial concentration of monomer;

$M_0$=molar mass of monomer;

$$\overline{Mn}_{theoritical} = M_0 \times \frac{[M]_0}{[A]_0} \times Xp$$

$X_p$=conversion rate $$\text{Initiator efficacy } (f) = \frac{\overline{Mn}_{theoritical}}{\overline{Mn}_{experimental}}$$

In the examples given below, the alcohoiates used are $CH_3(OCH_2CH_2)OLi$ or $CH_3(OCH_2CH_2)_2OLi$.

To prepare lithium 2-methoxyethoxylate, $CH_3(OCH_2CH_2)_2OLi$, the process according to Example a or b below was used:

EXAMPLE a

In a 500 ml two-necked round-bottom flask, equipped with a cooler and previously dried under an argon atmosphere, 250 ml of THF distilled over sodium is introduced with 3.5 g (0.5 mole, 2 eq.) of metallic lithium, previously cleaned. Methoxyethanol (30 ml, 0.25 mole), previously dried over $CaH_2$, is introduced in small portions. The mixture is heated to reflux for 12 hours, after which it is transferred into a 2-necked round-bottom flask by means of a capillary needle. This solution of approximately 1 M is stored at 0° C. in the dark.

EXAMPLE b

In a 500 ml round-bottom flask, previously dried under an argon atmosphere, 250 ml of THF distilled, over sodium, is introduced along with 0.25 mole of methoxyethanol, previously dried over $CaH_2$. BuLi (0.25 mole) is then introduced in small portions at ambient temperature. After 5 minutes, the solution is stored or used as is for polymerization.

To prepare lithium 2-methoxyethoxyethoxylate, the process used in Example c or d below was followed:

EXAMPLE c 0.5 mole alcohol $MeOCH_2CH_2OCH_2CH_2OH$ was added to 500 ml of cyclohexane. The alcoholate was prepared by reacting alcohol with 0.5 mole of BuLi in the presence of a few drops of diphenylethylene (DPE). This compound acts as a colored indicator (reaction of BuLi+DPE), indicating the absence of alcohol.

EXAMPLE d $MeOCH_2CH_2OCH_2CH_2OLi$ (0.5 mole) was obtained by reacting 0.5 mole of $MeOCH_2CH_2OCH_2CH_2OH$ with 1 mole of lithium metal in 500 ml of THF.

The reaction time is 12 hours and is followed by 6 hours of refluxing. The THF is removed by distillation. The desired quantity of cyclohexane is added to increase the solution to the desired concentration. Conversion is 100%.

The molecular weights and Ip's are based on GPC measurements, as indicated in Example 1. This example also shows the method of calculation for conversion $x_p$ of the monomer.

3.1. EXAMPLE 1

Synthesis of PnBuA with TMSM-Li as initiator in the presence of lithium 2-methoxyethoxylate as ligand.

All traces of impurities (moisture, oxygen, etc.) are avoided in the system; for this purpose, all reagents are purified as described below, degasified and held under pure nitrogen.

nBuA is first dried over calcium hydride ($CaH_2$) and distilled under reduced pressure (45 mbars) in the presence of octadecyl 3-(3,5-di-tert.-butyl-4-hydroxyphenyl) propionate as a non-volatile inhibitor of polymerization. After degasification, it is stirred for at least one night over $CaH_2$, chilled in a water bath, degasified again and stored at −18° C. It is then distilled from the $CaH_2$ just before use.

and a tube reactor. Before reaching the mixing chamber (four-jet mixer with tangential entry, volume of 1 $\mu$l), the solutions are brought to the desired reaction temperature by flowing through 5 m of capillary tubes in a thermostatted water bath. The solutions (initiation system and monomer) flow into the tubular reactor. The residence time is selected (between $2\times10^{-3}$ and 20 seconds) in the tubular reactor by changing the length "l" (4.4–500 cm) and the diameter "d" (0.5–2 mm) of the tubes, or the flow (1.3 to 5 ml/s). At the end of the tubular reactor, a sudden-termination tube is connected that mixes the methanol solution acidified with acetic acid (0.5% v/v) with the reaction solution. The temperature in the mixing nozzle $T_M$ and in the sudden-termination tube $T_Q$ is set by use of Philips Thermocoax® thermocouples (outside diameter, 0.5 mm).

The temperature $T_{eff}$ is linked by the equation $T_{eff}=T_M+$ 0.55 $(T_Q-T_M)$ with $T_M$=temperature of the mixture and $T_Q$=termination temperature. This temperature indicates the polymerization temperature.

The exact experimental conditions and results for the system described are given in Table 1 below.

TABLE 1

| Ex | I (cm) | Flow ($cm^3 \cdot s^{-1}$) | d (mm) | t (ms) | Conversion $x_p$ | $T_M$ (° C.) | $T_Q$ (° C.) | $T_{eff}$ (° C.) | $\overline{Mn}_{calc.}$ | $\overline{Mn}_{exp.}$ No Oligomers | Ip No Oligomers |
|---|---|---|---|---|---|---|---|---|---|---|---|
| 1a | 4.4 | 4.42 | 0.5 | 1.95 | 0.20 | −31.1 | −27.9 | −29.3 | 5227 | 6500 | 1.51 |
| 1b | 4.4 | 4.85 | 1.0 | 7.12 | 0.25 | −31.3 | −28.1 | −29.5 | 6426 | 8400 | 1.32 |
| 1c | 4.4 | 3.57 | 1.0 | 9.68 | 0.35 | −32.3 | −27.6 | −29.7 | 8928 | 11500 | 1.23 |
| 1d | 8.4 | 4.85 | 1.0 | 13.60 | 0.57 | −30.6 | −23.7 | −26.8 | 14660 | 20200 | 1.11 |
| 1e | 8.4 | 3.57 | 1.0 | 18.47 | 0.65 | −33.0 | −25.7 | −29.0 | 16783 | 22400 | 1.10 |
| 1f | 8.4 | 2.42 | 1.0 | 27.25 | 0.78 | −33.8 | −25.0 | −28.9 | 20115 | 26400 | 1.08 |
| 1g | 16.4 | 2.80 | 1.0 | 45.98 | 0.91 | −33.3 | −22.5 | −27.3 | 23360 | 31300 | 1.09 |
| 1h | 32.4 | 2.42 | 1.0 | 105.10 | 1.00 | −32.3 | −19.6 | −25.3 | 25634 | 32900 | 1.05 |

$\overline{Mn}$ in g/mole

A 1.0 M solution of TMSM-Li in pentane was used.

The toluene and THF were fractionated, then heated to reflux over potassium and introduced into a round-bottom flask linked to piping under vacuum. After degasification, the mixture was stirred with 5 ppm of benzophenone over a sodium/potassium alloy (⅓) until the solution turned blue; it was then distilled again just before use.

n-Octane was used as the internal standard for gas-phase chromatographic analysis of the residual monomer. It was degasified, dried by stirring over a sodium/potassium alloy (⅓) with 5 ppm of benzophenone and distilled into a vessel equipped with a Téflon® valve.

Anhydrous 2-methoxyethanol (2 ml) and 1 drop of (DPE) were added to 32 ml of toluene and cooled to 0° C. n-Butyllithium (16 ml, 1.6 M in hexane) were then added drop by drop to the mixture under pure nitrogen until a slight reddish color remained.

In a glove box, 1.1 ml of TMSM-Li and 11 ml of lithium 2-methoxyethoxylate were added, in a first vessel, to a mixture of 510 ml toluene and 27.5 ml THF ($[A]_0=10^{-3}$ mole/l; $[L]/[A]_0=5$). A second vessel, equipped with a Téflon® valve, was filled with 29.3 ml nBuA, 10.7 ml n-octane and 490 ml toluene ($[M]_0=0.2$ mole/l). A third vessel, equipped with a Téflon® valve, was filled with a termination agent, i.e., a solution of methanol acidified with acetic acid (0.5% v/v).

These three vessels were linked to the storage container of a tube reactor. The main parts of the reactor consist of three burettes containing the reagents. A motor simultaneously operates the plungers of the three burettes and impels the solutions through a mixing chamber (mixing time <1 ms)

Immediately after sampling, 1 $\mu$l of crude polymer solution is injected into a gas-phase chromatograph of the Fisons GC 8160 type, with a DB-1 capillary column, a length of 30 m, an internal diameter of 0.53 mm, a film thickness of 1.5 $\mu$m, FID. The ratio of the peak areas for the residual monomer and the n-octane, respectively $F_{monomer}$ and $F_{octane}$ leads to the conversion $X_p$ of the monomer.

$$X_p = 1 - \frac{\left[\frac{F_{monomer}}{F_{octane}}\right]_t}{\left[\frac{F_{monomer}}{F_{octane}}\right]_0}$$

The rest of the crude solutions is treated to obtain pure polymer. The first stage of this treatment consists in evaporation of the solvent(s) and residual monomer in a rotary evaporator at 30° C. Then, the remaining products are dissolved in benzene and filtered through filter paper. Finally, the benzene solution containing the polymer is lyophilized and a gel is obtained.

For GPC measurements, 10 mg of polymer are dissolved in 5 ml of THF containing 20 ppm of toluene as an internal standard. To correct the contraction or expansion of the gel or changes in flow, the elution volume had to be corrected for each sample in relation to the peak of the internal standard.

$$V_{e,corr} = V_{e,exp} \frac{[V_{e,cal,tol}]}{[V_{e,exp,tol}]}$$

$V_{e,corr}$=corrected elution volume $V_{e,exp}$=experimental elution volume $V_{e,cal}$tol =elution volume of toluene for standard $V_{e,exp}$tol =elution volume of toluene for sample Proceed as in Example 1, replacing the TMSM-Li with DPH-Li; the exact experimental conditions and results for the system: DPH-Li ($[A]_0=10^{-3}$ mole/l), nBuA ($[M]_0=0.2$ mole/l), lithium 2-methoxy-ethoxylate ($[L]/[A]_0=5$) in pure toluene are given in Table 2. The diameter of the tubes used was 1 mm.

TABLE 2

| Ex. | I (cm) | Flow (cm³·5¹) | t (sec) | Conversion $x_p$ | $T_M$ (°C.) | $T_Q$ (°C.) | $T_{eff}$ (°C.) | $\overline{Mn}$ calc. | $\overline{Mn}_{exp.}$ No Oligomers | Ip No Oligomers |
|---|---|---|---|---|---|---|---|---|---|---|
| 2a | 16.4 | 4.42 | 0.0291 | 0.641 | −28.4 | −20.7 | −24.2 | 16431 | 33200 | 1.10 |
| 2b | 32.4 | 4.42 | 0.0575 | 0.814 | −28.9 | −18.7 | −23.3 | 20866 | 40700 | 1.15 |
| 2c | 32.4 | 2.80 | 1.0908 | 0.877 | −31.3 | −19.2 | −24.6 | 22481 | 44000 | 1.20 |
| 2d | 64.4 | 3.98 | 1.1270 | 0.916 | −30.6 | −19.7 | −24.6 | 23481 | 48360 | 1.16 |
| 2e | 64.4 | 2.80 | 1.1806 | 0.941 | −30.8 | −19.6 | −24.6 | 24122 | 50100 | 1.16 |

$\overline{Mn}$ in g/mole

Sample solutions (100 µl) are injected into a combination of columns (solvent: THF, flow rate: 60 ml/h; 2 columns, 60 cm, 5µ PSS-DV-Gel, 10 nm) at ambient temperature (UV detectors Jasco-Uvidec 100 III and refraction index Bischoff RI-Detektor 8110). All of the columns are calibrated with standard PnBuA.

MALDI-TOF MS measurements were taken with a Bruker Reflex mass spectrometer equipped with a nitrogen laser delivering 3 ns laser pulses at 337 nm. The measurements were recorded in reflectron mode (matrix: 1,8,9-trihydroxyanthracene). For the detection of positive ions, rubidium trifluoroacetate was added to the polymer/matrix solution. The mixture (1 µl) was applied to the multi-stage target and air-dried. The acceleration voltage was 33.65 kV and the ions were reflected with 35 kV. The average for spectra was taken over 80 images.

The GPC elution graphs for the polymers obtained show a high, narrow molecular weight peak. The MALDI-TOF mass spectra show only the signals expected for linear polymers, indicating that the polymerization is reactive. Furthermore, there is a small fraction of oligomers (M<1000 g/mole), representing less than 2% of the total mass.

GPC reveals the presence of small quantities of oligomers; being difficult to integrate into the calculation of average molar masses, they were not taken into account.

The efficacy (f) of the initiator was determined based on the slope of the curve of the average degree of polymerization in number, as a function of the conversion, at f≈0.74.

3.2. EXAMPLE 2 (Comparative)

Synthesis of PnBuA with DPH-Li in the Presence of Lithium 2-methoxyethoxylate as Ligand DPE (97%) was dried by addition of n-butyllithium, drop by drop, until the red color characteristic of DPH-Li persisted. DPE was the distilled under reduced pressure in a funnel equipped with a Téflon®valve.

To prepare a solid DPH-Li initiator, 16 ml of n-butyllithium and 5 ml of DPE were added to 79 ml of hexane in a glove box at ambient temperature. The solution was stirred for two days, and the red precipitate was filtered, washed twice with hexane and dried overnight under vacuum. The red powder was kept under a nitrogen atmosphere at −18° C. Just before use, the calculated quantity of DPH-Li was dissolved in toluene.

The elution graphs for the polymers obtained show a higher polydispersity index for the high molecular weight peak than for systems initiated with TMSM-Li. The MALDI-TOF MS of polymers, initiated with DPH-Li, show the signals expected for linear polymers and, in addition, masses for cyclic β-ketoester terminal radicals, indicating a competition between termination and propagation. This is also indicated by the downward curvature of the first-order time-conversion curve. In addition, there is a high fraction of oligomers (M<1000 g/mole), which represents 5–10% of the total mass.

The efficacy (f) of the initiator was determined from the slope of the curve of the mean degree of polymerization in number, as a function of the conversion, as being f=0.47. This efficiency is significantly lower than that obtained with TMSM-Li.

In conclusion, from a comparison with the system initiated by DPH-Li in pure toluene, the system initiated by TMSM-Li represents an ideal reactive polymerization (no termination reaction in conformity with the MALDI-TOF MS measurements and the linear first-order time-conversion curve), with a narrower distribution of molecular weights, a greater initiation efficiency and a small quantity of oligomers.

3.3. EXAMPLE 3

Synthesis of PMMA with TMSM-Li as Initiator in the Presence of Lithium 2-methoxyethoxylate as Ligand This synthesis was conducted according to the process described in EP-A-0749987.

Operating Conditions:

$[MMA]_0=30\%$ by weight in toluene

Solvent=toluene/THF: 94%/6% (v/v)

$[L]/[A]_0=4$ $[A]_0=5.1\times10^{-3}$ mole/liter

The monomer and the initiation system are each impelled into a micro-mixer at a flow rate of 12 kg/h. The residence time in the micro-mixer is 0.05 s; the mixture is then fed into the polymerization reactor. Polymerization takes place at −32° C. in less than one second.

The results are shown in Table 3.

3.4. EXAMPLE 4 (COMPARATIVE)

Proceed as in Example 3, with the exception that DPH-Li is used as initiator instead of TMSM-Li with $[DPH-Li]_0=7.9\times10^{-3}$ mole/liter.

The results are shown in Table 3.

TABLE 3

| Ex. | [L]/[A]$_0$ | $\overline{Mn}_{Theoretical}$ | $\overline{Mn}_{Actual}$ | Ip | f | Conversion Rate* (%) |
|---|---|---|---|---|---|---|
| 3 (invention) | 4 | 58600 | 74200 | 1.7 | 0.79 | 100 |
| 4 (comparison) | 4 | 37800 | 50000 | 2.7 | 0.76 | 97.9 |

*This conversion rate is calculated as in Example 1.
In the case of these Examples 3 and 4, all of the columns were standardized with PMMA standards.
Mn in g/mole

3.5. EXAMPLE 5

Polymerization of MMA with TMSM-Li as Initiator in the Presence of Lithium Methoxyethoxylate as Ligand The reactor is a one-liter glass vessel with a bottom valve for drainage and an opening with septum for injection of methoxyethanol and TMSM-Li. Through pumps, the solvent (3% THF/97% toluene) and MMA, previously purified, is introduced under a blanket of nitrogen.

The [L]/[A]$_0$ ratio is 5.

Before each synthesis, the reactor is purged by three successive vacuum-nitrogen cycles. The reactor is loaded with solvent under a nitrogen blanket with stirring at 250 rpm. The solvent is used at ambient temperature to zero the machine using a 0.2 M solution of DPH-Li. When the zero point is stable (orange coloration), the reactor is chilled to −20° C. to prepare the lithium methoxyethoxylate.

Once that temperature is reached, methoxyethanol is introduced into the reactor at a pressure of 0.1 bar; the solution becomes colorless. n-Butyllithium is added drop by drop until the alcohol is neutralized (the solution becomes orange again), while monitoring that the temperature does not rise above −5° C. The desired quantity of initiator (solution of TMSM-Li in toluene at 1 M) is introduced. When the reactor is at a temperature between −20° C. and −10° C., the MMA solution is added drop by drop at the start, and when the solution becomes colorless, the speed of stirring is increased to 500 rpm and the monomer addition rate is increased. The period for introducing MMA is about 5 minutes. Once the reaction is completed, the polymer is deactivated by the addition of methanol. The reactor is then drained. Yield is 100%.

The results are shown in Table 4.

3.6. EXAMPLE 6 (COMPARATIVE)

Proceed as in Example 5, replacing the 1 M TMSM-Li solution with a 0.2 M solution of DPH-Li. Yield is 100%.
The results are shown in Table 4.

TABLE 4

| Ex. | Ip | % r.r.* |
|---|---|---|
| 5 (invention) | 2.0 | 81.0 |
| 6 (comparative) | 2.4 | 77.0 |

*The % r.r. (syndiotacticity rate) is calculated by NMR$^1$H.

This Table 4 allows comparison of the syndiotacticity rates (syndiotactic triads) obtained for a PMMA initiated by the TMSM-Li and DPH-Li systems, respectively.

3.7. EXAMPLES 7 (OF THE INVENTION) And 8 (COMPARATIVE)

Proceed as for Examples 3 and 4, respectively, taking into consideration the quantity of ligand necessary to control polymerization and obtain a number average molecular weight in number of 50,000 g/mole. The solvent is a mixture of 6% THF/94% toluene.

The results are reported in Table 5 and show a lower level of residual lithium in the inventive PMMA.

TABLE 5

| Ex. | [L]/[A]$_0$ | f | Ip | Yield (%) | mg Lithium/ kg PMMA |
|---|---|---|---|---|---|
| 7 (invention) | 2 | 0.72 | 2.5 | 100% | 600 |
| 8 (comparative) | 5 | 0.89 | 2.4 | 100% | 1000 |

3.8. EXAMPLES 9 (OF THE INVENTION) AND 10 (COMPARATIVE)

Proceed as for Examples 3 and 4, respectively, decreasing the [L]/[A]$_0$ ratio.

In the case of Example 9, [L]/[A]$_0$=2, the following results are obtained: f=0.72, Ip=2.5 and yield=100%.

In the case of Example 10, the DPH-Li precipitates with a value of [L]/[A]$_0$<3.

3.9. EXAMPLE 11

Proceed precisely as in Example 1 to polymerize tert.-butyl acrylate at −21° C. in a medium of 2.5% THF/97.5% toluene with [L]/[A]$_0$=5.

The results are the following for an Xp of 1.00:
f=0.61
Ip=1.15

3.10. EXAMPLE 12

Polymerization of MMA at 0C, initiated by TMSM-Li in a medium of 100% toluene with $CH_3(OCH_2CH_2)_2OLi$ In a batch reactor, under an inert atmosphere, $2.58 \times 10^{-3}$ mole $CH_3(OCH_2CH_2)_2OLi$ are introduced at a temperature of 0° C. into 80 ml toluene and $0.25 \times 10^{-3}$ mole TMSM-Li. After 25 minutes at 0° C., 4.2 g MMA are added, and after 60 minutes of reaction, the PMMA obtained has the following characteristics:
Yield 92%
$\overline{Mn}$=16200 g/mole
f=0.95
Ip=2.6.

3.11. EXAMPLE 13

Synthesis of copolymer with PMMA-b-PnBuA blocks

The kinetic studies for n-BuA at T=−20° C. indicate that the reaction is extremely rapid ($t_{1/2}$<0.01 s), but is easily controlled using the equipment as in Example 1.

Reactive PMMA anions were used to initiate the nBuA in a second mixing chamber as described in Example 1, at T=−10° C.

Figure 1:
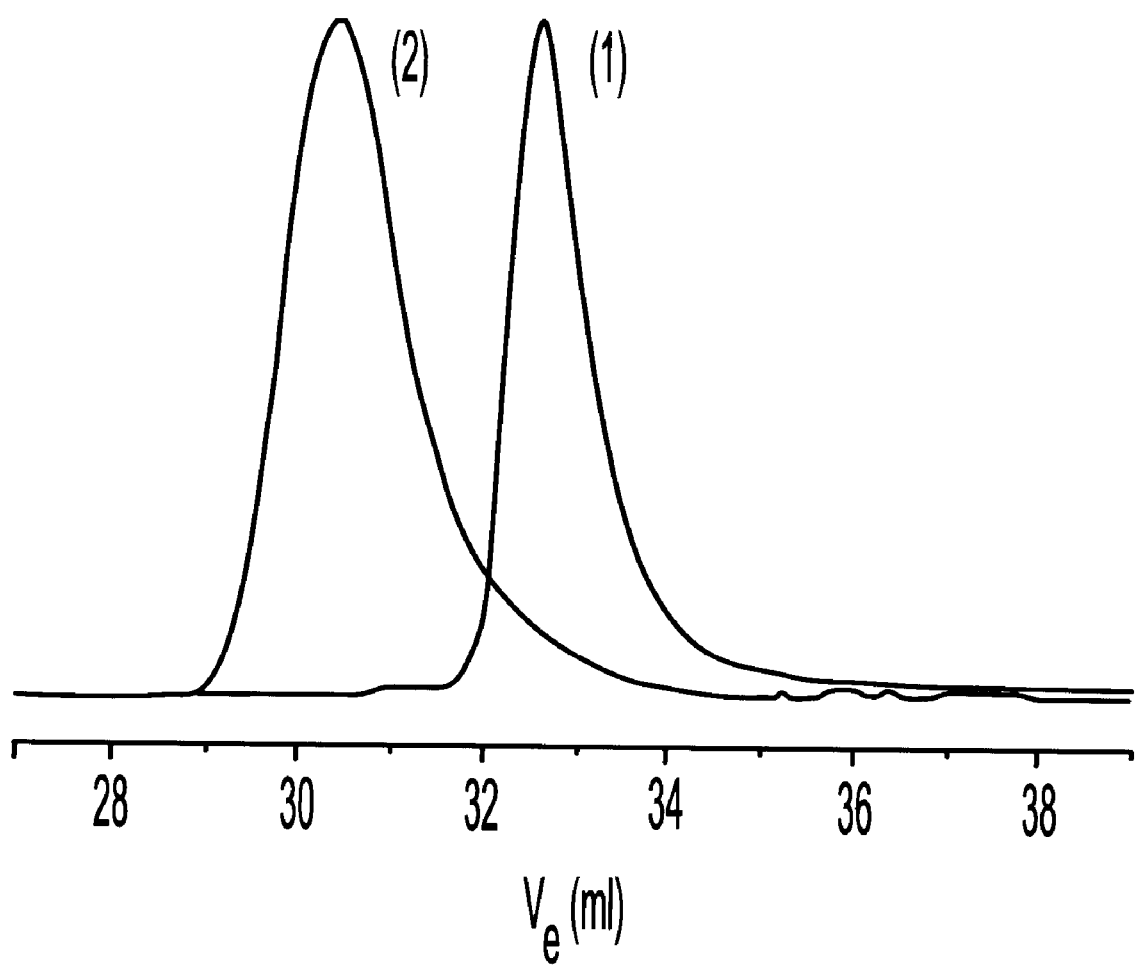
FIG. 1 in the appended drawing represents the results obtained by GPC for PMMA-b-PnBuA:
Experimental Conditions
[L]/[A]$_0$=10
Solvent=toluene
$T_{\mathit{eff}}$=10° C.

1—Reactive PMMA Sequence
Initiator: [TMSM-Li]=$10^{-3}$ mole/l
[MMA]$_0$=0.05 ml/l
Xp of reactive PMMA block=1.00
Reactive PMMA=$\overline{Mn}$=7500, $$\frac{\overline{Mw}}{\overline{Mn}} = 1.25 \text{ (curve 1)}$$

2—PnBuA Sequence
Initiator: [Reactive PMMA]=$6.7 \times 10^{-4}$ mole/l
[nBuA]$_0$=0.067 ml/l
PMMA-b-PnBuA: $\overline{Mn}$=27000;

$$\frac{\overline{Mw}}{\overline{Mn}} = 1.35 \text{ (curve 2)}$$

The results obtained by GPC show a coupling efficiency of the second sequence (PnBuA) for the first sequence (reactive PMMA) of more than 95% and a narrow molecular distribution for the block copolymers.

What is claimed is:

1. An initiation system for anionic copolymerization of (meth)acrylic monomers comprising (1) either one or more monofunctional initiator(s) or one or more difunctional initiator(s), characterized in that these initiators are silylated compounds chosen from among:

monofunctional silylated initiators of Formula (I):

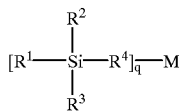
(I)

wherein:
R$^1$, R$^2$, R$^3$ each independently represent an alkyl radical, linear or branched, containing 1 to 8 carbon atoms;
R$^4$ represents an alkylene radical, linear or branched, containing 1 to 8 carbon atoms;
M designates an alkaline metal or alkaline earth (valence q is 1 or 2), or the difunctional silylated initiators of Formula (II):

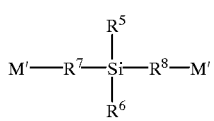
(II)

wherein:
R$^5$ and R$^6$ each independently represent a linear or branched alkyl radical containing 1 to 8 carbon atoms;
R$^7$ and R$^8$ each independently represent a linear or branched alkylene radical containing 1 to 8 carbon atoms; and
M' designates an alkaline metal,
and (2) at least one alkaline metal alcoholate as ligand.

2. The initiation system according to claim 1, characterized in that R$^1$, R$^2$, R$^3$, R$^5$ and R$^6$ each represent a methyl.

3. The initiation system according to claim 1, characterized in that R$^4$, R$^7$ and R$^8$ each represent a methylene.

4. The initiation system according to claim 1, characterized in that M and M' each represent lithium.

5. The initiation system according to claim 1, characterized in that the alkaline metal alcoholate(s) (1) are selected from among those according to Formula (III):

ROM" (III)

wherein:
M" represents an alkaline metal; and
R represents a radical of Formula (IV):

R$^9$(OR$^{10}$)$_p$ (IV)

wherein:
R$^9$ represents an alkyl radical, linear or branched, with 1 to 8 carbon atoms, an aryl radical, an arylalkyl or alkylaryl radical wherein the alkyl group has 1 to 8 carbon atoms;
R$^{10}$ represents an alkylene radical, linear or branched, with 1 to 4 carbon atoms;
p is a whole number, 0, 1, 2 or 3; and
when p is equal to 2 or 3, the R$^{10}$s are identical or different.

6. The initiation system according to claim 5, characterized in that, in Formula (III), M" is lithium.

7. The initiation system according to claim 1, characterized in that molar ratio of the additive/ the initiator is between 1 and 20.

8. The initiation system according to claim 7, characterized in that the molar ratio is between 2 and 10.

9. An initiation system for anionic copolymerization of (meth)acrylic monomers, comprising (2) at least one alkaline metal alcoholate as additive and (1) an initiator comprising
monofunctional silylated initiator:

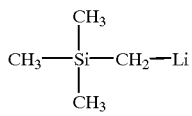

or difunctional silylated initiator:

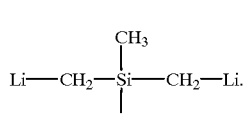

10. The initiation system of claim 9, wherein the initiator comprising trimethylsilylmethyllithium.

* * * * *